(No Model.)
G. HEIDEL.
SAD IRON.
No. 460,868. Patented Oct. 6, 1891.
Fig. I.
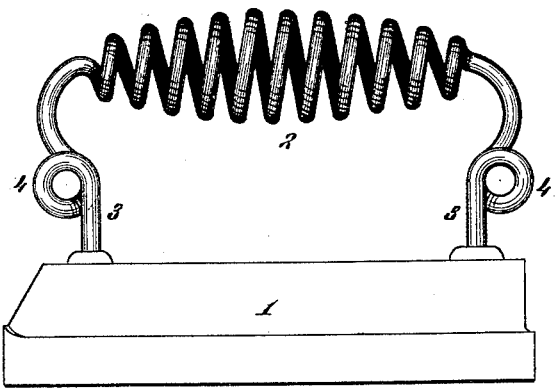
Fig. II.
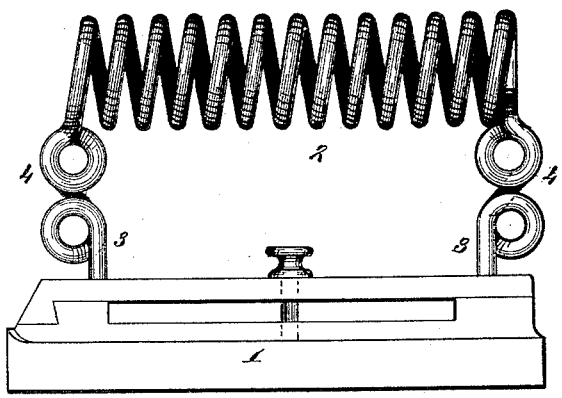
Attest:
E. Arthur
M. E. Ourand.
Inventor:
Gustavos Heidel
By Knight Bros
attys

UNITED STATES PATENT OFFICE.

GUSTAVOS HEIDEL, OF ST. LOUIS, MISSOURI, ASSIGNOR TO WILLIAM MEAD FERRIS, OF SAME PLACE.

SAD-IRON.

SPECIFICATION forming part of Letters Patent No. 460,868, dated October 6, 1891.

Application filed March 14, 1890. Renewed July 10, 1891. Serial No. 399,066. (No model.)

*To all whom it may concern:*

Be it known that I, GUSTAVOS HEIDEL, of the city of St. Louis, and State of Missouri, have invented a certain new and useful Improvement in Sad-Irons, of which the following is a full, clear, and exact description, reference being had to the accompanying drawings, forming part of this specification.

My invention relates to certain improvements in sad-irons; and my invention consists in features of novelty hereinafter fully described, and pointed out in the claim.

Figure I is a side elevation illustrative of my invention. Fig. II is a similar view showing a modified form of my invention.

Referring to the drawings, 1 represents the body of the iron, which may be made either in a solid form, as shown in Fig. I, or with a removable top portion, as shown in Fig. II, the form shown in Fig. II being designed to permit the escape of heat from the upper portion of the body of the iron and thus prevent to some extent the heating of the handle.

2 represents the handle portion of the iron, and 3 the shanks connecting the handle to the body. The handle is made open, so as to permit a circulation of air through it, and it is formed of wire bent into a number of coils, as shown. This permits a circulation of air through the handle, both longitudinally and transversely, and prevents the handle being heated to any considerable height of temperature by the body. The shank 3 may be formed integral with the handle by extending the ends of the wire of which the handle is formed in a downward direction and uniting them to the body. These shanks I form with one or more coils 4, (I have shown one coil in Fig. I and two coils in Fig. II,) the object of these coils being to permit a circulation of air around the shanks and thus also prevent the circulation of heat from the body to the handle through the shanks.

A handle for sad-irons thus made is cheap and light, and does not become heated to any such high degree of temperature as will make the handle too warm to be grasped by the naked hand in use.

I am aware that it is not broadly new to construct sad-irons with coiled metallic handles, and this I do not claim; but I am not aware that a sad-iron such as set forth in my claim has ever been made, and to this form I limit myself.

I claim as my invention—

A sad-iron having a body, a handle, and shanks, the handle being formed integral of one piece of wire coiled to form a hand-hold and to form vertical loops 4 in the shanks, substantially as herein shown and described.

GUSTAVOS HEIDEL.

In presence of—
THOMAS KNIGHT,
E. S. KNIGHT.